Figure 1:
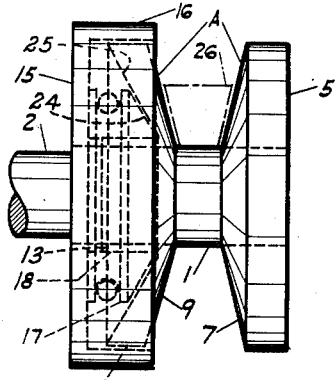

Dec. 30, 1952    M. H. DAVIS    2,623,400
POWER TRANSMISSION AND CENTRIFUGAL CLUTCH
Filed Jan. 15, 1948    2 SHEETS—SHEET 1

INVENTOR.
MARION H. DAVIS
BY Arthur Robert
ATTORNEY

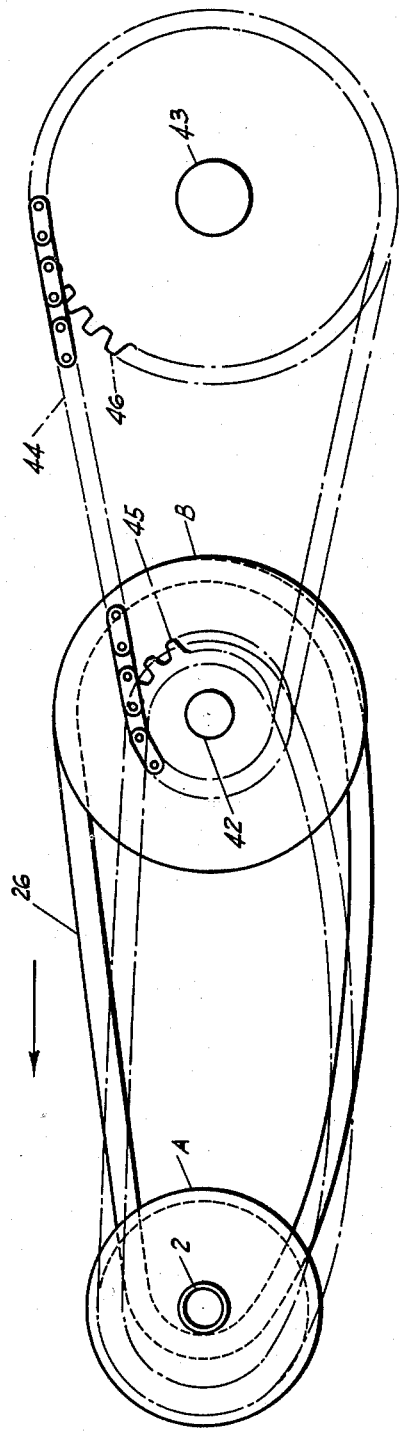
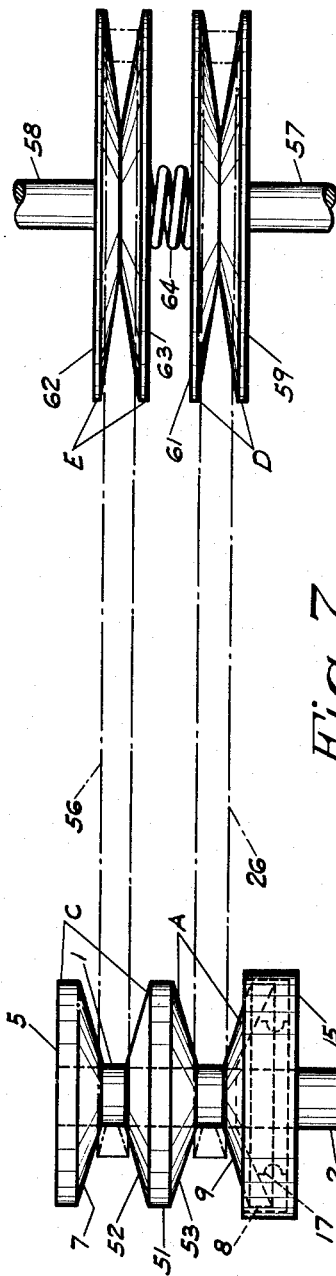

Patented Dec. 30, 1952

2,623,400

UNITED STATES PATENT OFFICE 2,623,400

POWER TRANSMISSION AND CENTRIFUGAL CLUTCH

Marion H. Davis, Hagerstown, Ind.

Application January 15, 1948, Serial No. 2,451

5 Claims. (Cl. 74—230.17)

This invention relates to an improved driving mechanism between a driven member and a driving member and relates in particular to a belt drive combining an automatically variable drive ratio in conjunction with a centrifugally operated clutch.

It is an object of my invention to provide a power transmission mechanism between a driving member and a driven member in which the drive ratio therebetween is automatically varied in a predetermined relationship, and in which engagement or disengagement is automatically effected at a predetermined speed of rotation.

Another object is the provision of a power transmission mechanism embodying a centrifugal clutch in conjunction with an automatically variable drive ratio between a driving member and a driven member.

Still another object is the provision of power transmission mechanism between a driving member and a driven member including a centrifugal clutch and in which the drive ratio is automatically varied in accordance with the load on the driven member.

Another object is the provision of a combined variable ratio drive and centrifugal clutch member of simple construction and which is inexpensive to manufacture.

In accordance with the present invention, I provide a power transmission mechanism having an endless connecting member between a centrifugally actuated driving pulley providing a variable effective diameter and a driven pulley, so as to provide an automatically engaged driving connection and an automatically variable drive ratio under operating conditions therebetween. The drive ratio is varied in accordance with variations in the load on the driven pulley, the speed of the driving pulley, or other working conditions, in a manner which may be predetermined in the design of the power transmission mechanism. The range of variations in the drive ratio may be increased by providing a resiliently biased driven pulley adapted to engage the connecting member on various diameters. Further, by providing multiple centrifugal actuated driving pulleys, which may be operated by a common centrifugal actuated means, and an equal number of resiliently biased driven pulleys connected thereto by endless connecting members, the drive ratio between each pair of driving and driven pulleys may be automatically varied to provide a differential drive for distributing the total driving force or torque among the driven pulleys in accordance with the power requirements for each driven pulley. This distribution of power may be predetermined by selection of resiliently biasing means for the driven pulleys which may exert thereon an equal or unequal bias.

In the preferred embodiment, the connecting member is in the form of an endless belt generally V-shaped in cross section, and the driving and driven pulleys are correspondingly V grooved, the driving pulley being actuated centrifugally to engage the V belt. The driven pulley may comprise a conventional V groove pulley or may comprise a V pulley of separable sections which are resiliently pressed into engagement with the belt, the spring or other suitable resilient means employed being suitably selected for the power requirements. A single or multiple driving pulley may be employed, depending on the load and power requirements and the strength of the belts employed, and a corresponding number of driving pulleys are employed therewith. Where a differential action is desired the centrifugally operated driving member is connected by a plurality of belts to independent V pulleys which may be conventional pulleys or separable spring biased pulleys.

The combined variable ratio drive and centrifugally operated clutch in its preferred embodiment comprises a dog consisting of a plurality of weighted wedge members which are driven radially outward by centrifugal force and serve to engage and move one of the driven pulley sections axially relatively to the other pulley section so as to engage the driving belt on a variable diameter. The diameter for initial drive engagement may be predetermined by the design of the clutch. The weighted wedge members preferably are employed in conjunction with a suitable spring member which tends to oppose centrifugal force so that when the driven member is at rest, or is operating at a low speed, the wedge members are maintained at or near their innermost radial position, and the pulley sections are out of driving engagement with the belt. The wedge members may be of any suitable construction, although I prefer to construct them in the shape of a right frusto-conical member divided into a number of segments. Any number of segments may be employed, depending on the desired weight of each, the diameter of the driving pulley and other considerations. For most purposes a three-segment division is preferred. These segments cooperate in conjunction with a suitable abutment member which may rotate therewith, so that as they move outward by centrifugal force they act as wedges between the abutment member and the adjacent pulley section to move the pulley section axially.

Figure 2:
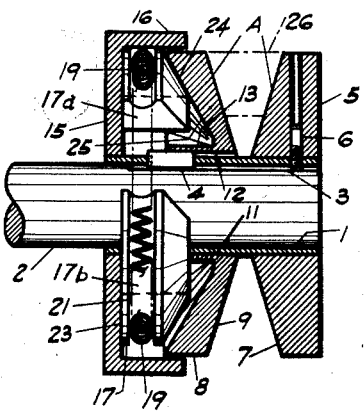
Figure 3:
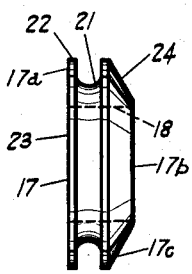
Figure 4:
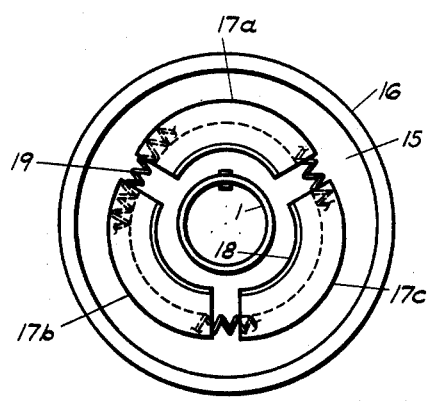
Figure 5:
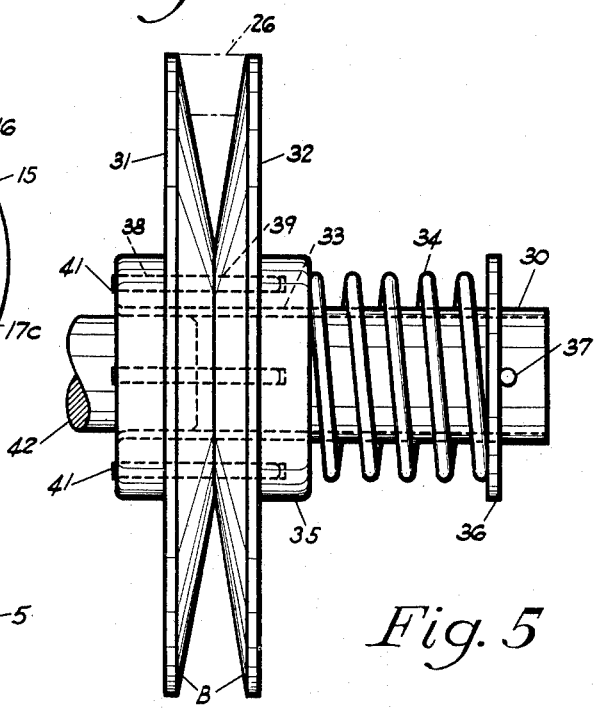
Figure 4A:
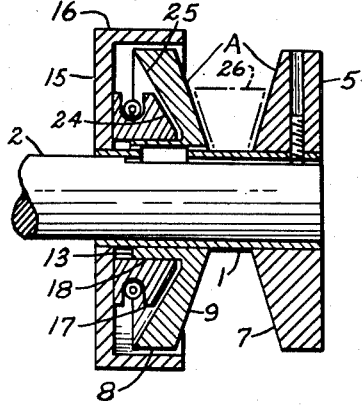

The invention will be described in greater detail in connection with the accompanying drawing wherein are illustrated preferred embodiments of the invention by way of example, and wherein:

Figure 1 is a side view of a preferred embodiment in disengaged position,

Figure 2 is a diametrical vertical sectional view of Figure 1 with the dog shown in elevation at the extremity of engaged position, Figure 3 is an elevation of the dog in collapsed position, Figure 4, is an end view as seen from the right in Figure 1 with the pulley sections removed and the dog segments in intermediate position, Figure 4a is a section taken on line 4a—4a of Figure 4 showing the dog segments in retracted position, Figure 5 is a side view of a preferred driven pulley, Figure 6 is a diagrammatic view illustrating the principle of operation of an embodiment of the invention, and Figure 7 is a diagrammatic view illustrating the principle of operation of a modification.

Referring to the drawing, Figures 1 and 2, there is shown a sleeve or core member 1 of suitable material adapted to be received on a driving shaft 2. Shaft 2 may have a keyway 3 therein which receives a key 4 brazed or otherwise secured in sleeve 1 to hold the sleeve and shaft to rotate together. Sleeve 1 has a flange 15 brazed or otherwise secured thereon to rotate therewith, and a set screw 6 in flange 5 engages the shaft to prevent removal of the sleeve from the shaft. Flange 5 has a convex frusto-conical face 7 on one side. A second flange 8 with a convex frusto-conical face 9 has a bore 11 which receives the sleeve 1, and a spline 12 therein receives the key 4 so that flange 8 and sleeve 1 are splined to rotate together while flange 8 is capable of axial movement along sleeve 1. If desired, flange 8 may have an integral sleeve 13 with the spline 12 extending therethrough, which serves to guide the flange in its axial movement and prevent cocking or canting thereof. Or, if desired, flange 8 may be freely rotable on sleeve 1. Flanges 5 and 8 and their convex frustoconical faces 7, 9 respectively constitute a V pulley designated generally at A.

An abutment or stop member in the form of a plate 15 having a peripheral flange 16 is suitably secured to the sleeve 1 at a suitable distance from the flange or pulley section 5, and a centrifugal dog member indicated generally by the numeral 17 is located between flange or floating pulley section 8 and abutment plate 15. Dog member 17 is made up of a plurality of annular segments, three segments 17a, 17b and 17c (Fig. 4) being shown in the modification illustrated, and in collapsed or idling position the sleeve 13 on pulley section 8 is received in the central opening 18 therethrough. The segments are held in collapsed position with the face of opening 18 in clamping engagement with sleeve 13, by a helical spring 19 formed into an annulus and received in the circumferential groove 21 formed in the circumferential face 22 extending around the dog. However in some cases, as for example, when the sleeve 1 rotates on a vertical axis, spring 19 may be omitted, or any other suitable means for resisting expansion of the segments, may be provided. When the sleeve 1 is rotated the separate segments or wedges 17a, 17b and 17c are forced radially outwardly by centrifugal force. Flange 16 limits the extreme outward movement of the wedges.

Dog 17 has a normal face 23 and has a convex frusto-conical face 24. Pulley section 8 has a concave frusto-conical face 25 which may be disposed at the same apex angle as face 24, and the faces 24, 25 are maintained in engagement in the operating position of the pulley. A V belt 26 is adapted to be driven by the pulley A.

The operation of the clutch will now be described. When the driving pulley A is at rest, or is rotating very slowly, the spring 19 maintains the dog segments 17a, 17b and 17c at their central position shown in dotted lines in Figure 1, with the surface of opening 18 clamped to sleeve 13 which is keyed to the shaft or sleeve 1 to rotate with the drive shaft 2, and pulley section 8 is free to move axially away from pulley section 5 a sufficient distance so that belt 26 has no driving engagement therewith, but idles on sleeve 1 as shown in Figure 1. Hence, belt 26 will not be driven by pulley faces 7, 9. In this position a clearance or lost motion is provided for the wedges. This will be apparent by inspecting Figures 1 and 4a from which it will be seen that when the segments are in radially inward collapsed position with surface 18 engaging surface 13 and the cam face 23 engaging the cam face of abutment plate 15 there is a clearance which allows the floating pulley section 8 to take a position simultaneously free of the belt and wedge segments. In this position the floating pulley section is unrestrained for movement along the shaft between contact position with the segments and engagement position with the belt. As the pulley speed increases, centrifugal force acting on the dog segments moves them radially outward against the bias of spring 19, and as they move outward face 23 is in engagement with abutment 15 and convex conical wedge face 24 is in engagement with concave conical face 25 of the pulley section 8, so that the dog segments act as wedges between abutment 15 and pulley section 8 and force pulley section 8 nearer and nearer to pulley section 5 until the pulley sections come sufficiently close together to engage and drive the belt 26. In Figure 4, the segments are shown in a position intermediate the fully expanded and collapsed position. The belt 26 thus will be engaged on the smallest driving diameter of the driving pulley, which, it is understood, is not necessarily the smallest diameter of the pulley. After driving engagement is established between the belt 26 and the pulley sections 5 and 8 frictional engagement of the wedge segments with the abutment and pulley cam face 25 is sufficient to maintain rotation of the segments so as to maintain a centrifugal force dependent on speed. Spring 19 may be just the required strength to determine at what speed driving engagement is initiated.

Under certain driving conditions, as where the driving pulley A continues to accelerate after initial driving engagement, the wedges are forced further radially outward thus causing the conical sides 7 and 9 to engage the driving belt 26 on an increasing diameter, until eventually the dog segments may reach their extreme position limited by engagement of circumferential face 22 with the stop flange 16, as shown in Figure 2. In this position the belt 26 will be engaged at the largest driving diameter of the pulley A. It may be noted that because the radius of curvature of concave face 25 adjacent its periphery is not the same as the radius of curvature of face 24, the engagement of each segment with face 25 will be mainly at the median portion of each segment. It is to be noted also that stop flange 16 rotates with the dogs, so there is no relative circumferential movement therebetween. The action of the clutch therefore depends on frictional engagement between the pulley A and the belt, and normally wear takes place mainly on the belt. This wear on the belt is small, so that the belt will last a long time, and eventually, when it has to be replaced the replacement cost is small.

In the structure illustrated in Figures 1 and 2 the sleeve 1 may be regarded as a hollow shaft, or may be replaced by a solid shaft. The structure illustrated provides an assembly which may be constructed as a unit easily positioned upon any suitable shaft. As it is operable in either direction of rotation the clutch unit may be assembled to the shaft with the abutment plate at the right or left side. It will be understood that, if desired, the sleeve 1 may be omitted, in which case the pulley section 5 and abutment 15 are mounted directly on the shaft 2, and the pulley section 8 is axially slidable on the shaft. Also, if desired, the structure may be reversed by having the abutment plate 15 concave conical and the surface 25 of pulley section 8 normal, in which case the dog sections are inverted to have the normal surface 23 engage the normal surface on the pulley.

The clutch may be employed to drive a fixed diameter V belt driven pulley through the belt 26, or may drive an adjustable diameter V belt pulley.

Referring to Figure 5, a sleeve 30 extends through the central aperture in a pulley section 31 and is suitably fastened thereto. A second pulley section 32 has a bore 33 which receives sleeve 30, and pulley section 32 is biased against pulley section 31 by a helical spring 34, one end of which abuts the hub 35 of pulley section 32, and the other end of which abuts a plate or washer 36 fitted over sleeve 30 and held thereon by a pin 37. Pulley sections 31, 32 have a plurality of aligned bores 38, 39 in their hubs and pins 41 loosely fitted therein couple the pulley sections for rotation together. Together, pulley sections 31, 32 constitute a driven pulley B. Any suitable means may be employed to limit the extent to which the pins 41 may protrude from bores 38 to prevent them falling out of place. A shaft 42 may be received in the sleeve 30 and the pulley sections and sleeve may be securely fastened to the shaft in any suitable manner.

The operation of a drive arrangement embodying the invention now will be described with particular reference to Figure 6. The driving shaft 2 may be the shaft of a prime mover or other source of power, and the belt 26 passes between the faces 7 and 9 of the pulley A, and between the pulley sections 31, 32 of driven pulley B. Shaft 42 may be the ultimate driven shaft, or may be an intermediate shaft, in which case power is transmitted to the ultimate driven shaft 43 by means of a suitable chain 44 and sprockets 45 and 46, or in any other suitable manner. The length of endless belt 26 preferably is about double the center to center distance between shafts 2 and 42 plus one half the mean or pitch circumference of pulleys A and B. Assuming the shaft 2 is at rest, the driving pulley sections 5 and 8 will be in spread position out of engagement with belt 26 as shown in Figure 1, and the belt 26 will idle over the central sleeve 1 without being driven thereby. At the driven shaft 42, the pulley sections 31, 32 are maintained in engagement with the belt 26 by spring 34, and the belt 26 is substantially at the outermost driving diameter of driven pulley B as shown in Figure 5. This position of the belt 26 is shown in full and dotted lines in Figure 6.

When driving shaft 2 starts to rotate pulley A, centrifugal force urges the wedge segments 17a, 17b and 17c outwardly against the compressing firce of spring 19, thus moving pulley section 8 closer to pulley section 5, until at a predetermined speed of rotation the belt is engaged and driven by the faces 7 and 9 of pulley A on some intermediate diameter, and belt 26 commences to drive the driven pulley B. Operating with a fixed belt length, this initial engaging diameter is determined by the mass of the wedge segments, the force of the spring 19, the maximum distance between the pulley sections 5, 8, the width of the belt, the apex angles of conical faces 24 and 25, and other factors which may be predetermined in the design of the drive. At driving engagement the engaging diameter of the driving pulley A will be small so that the drive mechanism becomes operative at a low ratio of driving pulley diameter to driven pulley diameter.

The spreading action of the wedges of given mass will vary with the centrifugal force, which in turn depends on the speed of rotation of the driving shaft 2, and this force will be balanced by the load on the driving belt 26. Because of the large magnitude of the starting inertia, the force required to start the driven pulley B is greater than that required to further accelerate the driven pulley. Consequently after the driven pulley begins to turn the tension on the upper or driving run of the belt is relaxed thus causing sufficient slack in the driving run to feed the belt outwardly to a larger diameter on the driving pulley A. In an arrangement in which the driven grooved pulley is solid, that is—is not composed of separable sections—the belt will continue to feed outwardly on the driving pulley A as the turning resistance of the driven pulley B decreases until at the minimum power requirement the pitch or mean driving diameter on the driving pulley is attained. Thus the effective diameter ratio of the driving pulley to the driven pulley is a minimum at the start and builds up to a maximum as the power requirements decrease.

In the case where a resiliently separable drive pulley B is employed, slack in the lower or idling run of the belt tends to feed the belt to a larger diameter on the driven pulley. The development of any slack in the driving run necessarily decreases the slack in the idling run, so that when the belt feeds to an increased diameter on the driving pulley because of slack in the driving run, the idling run of the belt loses slack and feeds to a smaller diameter on the driven pulley. Thus, the working diameter of the driving pulley is not limited to the mean or pitch diameter as a maximum, and the belt may feed outwardly to the maximum diameter of the driving pulley while feeding inwardly to a minimum diameter on the driven pulley, as shown in dot and dash lines in Figure 6. This provides a wider range of variation in drive ratios. By employing a wide belt a still greater range of variation in the drive ratios may be obtained.

Assuming the driving pulley rotating at a constant speed, the belt will find a position of balance on the driving and driven pulleys which will maintain a given tension in the belt. An increase in load on the driven pulley will reduce the slack in the driving run of the belt and increase the slack in the idling run, so as to cause the idling run to feed into the driven pulley on a larger diameter, and cause the driving run to feed into the driving pulley on a smaller diameter, until a condition of balance is reached where the constant tension in the belt is restored. This will result in the belt operating on a smaller diameter on the driving pulley and a larger diameter on the driven pulley. Conversely, a decrease in the load on the driven pulley will cause the belt to take a position of balance at constant tension on a larger diameter of the driving pulley and a smaller diameter on the driven pulley. Thus the apparatus may be employed so as to secure a variation in speed of the driven member depending on load, while the driving member operates at any desired constant speed.

An increase in speed of the motor operating the driving pulley will increase the wedging action of the dog segments by driving them radially outward, thus requiring a greater belt tension to balance the wedging action. Assuming no change in load, this causes the belt to engage on a smaller diameter on the driven pulley thereby increasing the slack on the driving run of the belt and causing the belt to engage on a larger diameter on the driving pulley, and a smaller diameter on the driven pulley, and a new balance now will be attained with a higher belt tension. At the new speed, any change in load will again readjust the belt to the proper positions on the driving and driven pulleys to maintain this higher constant tension in the belt. Likewise, a simultaneous change in load on the driven pulley and change in speed of the driving pulley will automatically result in the belt attaining a position on the driven and driving pulleys in which a predetermined tension is maintained on the driving run of the belt.

The operation with a fixed diameter driven V pulley is similar to that above described. However, in such case the belt operates always substantially on a constant diameter on the driven pulley, and on a variable diameter on the driving pulley so that a smaller range in variations of drive ratios are obtained.

In the modification shown in Figure 7, wherein like parts are designated by like reference numerals, the shaft 2 carries a pulley section 51 axially slidable thereon between the end pulley sections 5 and 8. Pulley section 51 may be suitably keyed to shaft 2 so as to rotate therewith. The pulley section 51 has convex oppositely sloping or frusto-conical faces 52 and 53 so that faces 9 and 53 form one V groove pulley A, and faces 7 and 52 form another V groove pulley C. When the wedge segments of dog 17 move outward, the pulley section 8 is moved toward section 51 and through belt 26 moves pulley section 51 toward pulley section 5, so that the effect is that the two pulleys A and C are substantially simultaneously increased in effective diameter. A second driving belt 56 is provided for pulley C.

The driven pulley arrangement comprises two separate driven shafts 57 and 58, shaft 57 carrying a pulley section 59 fixed thereon, and a cooperating pulley section 61 rotatable therewith and free to move axially on shaft 57 relative thereto. The pulley formed by sections 59, 61 is designated as pulley D. Similarly, pulley section 62 is fixed on shaft 58 and a pulley section 63 is capable of axial motion relative thereto, these pulley sections being designated as pulley E. A helical spring 64 located between the pulleys D and E biases pulley section 61 toward section 59, and biases pulley section 63 toward section 62. This structure is described in detail in my said application and is illustrated in Figure 2 thereof, and need not be described in greater detail here.

The mechanism shown in Figure 7 is capable of operation as a combined automatic clutch, an automatically variable driving ratio transmission, and a differential drive, as will now be explained. When operating as an automatic clutch, the segments of dog 17 are initially at their innermost position and pulley sections 8 and 51 are spread so that the belts 26 and 56 are not in driving engagement with pulleys A and C. Assuming the load is equally distributed between driven pulleys D and E, when pulleys A and C reach a predetermined speed the dog segments force pulley section 8 towards pulley section 5 thus simultaneously gripping the belts 26 and 56 between the faces of pulleys A and C to drive the belt. The clutch action on each belt thus is like that described in connection with Figure 1, and as long as the load is equally divided between shafts 57 and 58, this modification will act as a variable ratio transmission as previously described. For these purposes, the multiple driving pulley modification may be employed with multiple fixed diameter pulleys on a single driven shaft, or with multiple variable diameter pulleys embodying for example, a multiplicity of the units illustrated in Figure 5, on a single shaft.

The differential functioning of the apparatus now will be described. When the belts 26, 56 are in driving engagement and the load is evenly divided between the driven pulleys D and E the belts will be operating at substantially the same diameter on the driving pulleys A and C and substantially at the same diameter on the driven pulleys, although the driven diameter need not be the same as the driving diameter. As applied to a vehicle going around a curve in which the pulley D drives the outer wheel and the pulley E drives the inner wheel, the heavier load on pulley E increases the slack in the idling run of the belt 56 and causes the belt to feed outwardly on pulley E to increase the effective diameter. At the same time the decrease in slack in the driving run of belt 56 causes the belt to feed inwardly and reduce the effective diameter of the driving pulley C. This changes the ratio between the driving and driven pulleys and causes a decrease in speed of rotation of the driven pulley E. At the same time, the lighter load on pulley D causes an increase in slack of the driving run of the belt 26 thus causing the belt to feed outwardly on the driving pulley A and inwardly on the driven pulley D, resulting in an increase in speed of rotation of the driven pulley D. Thus pulley E on the inside turn wheel of the vehicle is driven at a lower speed than pulley D on the outside turn wheel of the vehicle. The driving ratio will in all cases be distributed between the two belts 26 and 56 as required to maintain a substantially constant tension in the two belts.

A lightweight automobile or similar motor propelled vehicle equipped with a drive mechanism herein disclosed may be operated merely by the motor controller or throttle to cause starting of the vehicle, and to vary the speed of travel, as no manual clutch operation is required. At a given power output of the motor the speed of the vehicle will automatically be adjusted for the road conditions and merely by operating the throttle or motor controller the power output of the motor may be varied as desired while at the same time the drive ratio will automatically be adjusted to maintain a constant tension at the driving belts at the particular speed of the motor. Thus on an ascending incline the driving ratio will automatically be adjusted in accordance with the power delivered by the motor and the load to be overcome so that it becomes practically impossible to stall the motor. Should the load become too great the decrease in speed of the motor causes the wedge segments to release the pulley sections thus allowing slippage of the belt on the driven pulley, while the resulting acceleration of the driving pulley, due to the release of the load thereon, will cause the driving pulley to automatically reengage the belt at the most favorable driving ratio.

Furthermore, a vehicle so equipped can pull itself out of mud or any other road situation in which one wheel fails to get traction, because automatically a strong pull will be exerted on the belt connected to the wheel able to secure the greater traction, and a lighter pull will be exerted on the wheel having lesser traction. The wheel unable to secure traction will exert a light pull on its belt so as to cause its belt to engage on the largest diameter of the driving pulley. If both wheels are securing traction, the driving ratio automatically adjusts itself for the wheels to secure substantially the maximum pull on each wheel for the traction available. Thus the power of the motor will be distributed to the wheels in proportion to the load thereon.

Among the benefits realized by this invention are the absence of close fitting parts, simplicity of construction of the invention and consequent low cost of manufacture thereof, and the absence of wearing parts. There is practically no drag or creep of the belt in disengaged position or at disengaging speed and engagement is cushioned to velvety smoothness. The invention is of value in installations involving a high starting torque, as the clutch engages initially on a diameter smaller than the normal operating diameter. The invention is of special value in connection with electric motors as it may be set to allow the motor to accelerate to nearly full speed before driving engagement commences, thus effecting economies in power consumption, and allowing the use of a smaller motor for a given load. Because the prime mover engages the load at a mechanical advantage, the starting speed may be reduced, less power is lost through friction, and a greater over-all efficiency is obtained.

The V belt is the only non-metal portion of the device subject to wear, and if the proper length of belt is employed, the wide range of movement in the device automatically compensates for wear or stretch of the belt so that no belt tightener is required. The belt may be changed when required without disturbing the center-to-center setting of the driving and driven shafts.

I claim as my invention:

1. A device of the class described comprising: a shaft; a first pulley section rotatable with the shaft providing a conical belt-engaging face; a floating pulley section mounted on the shaft to rotate therewith and providing a complementary conical belt-engaging face forming a V-groove with the first pulley section adapted to receive a V-belt, said V-groove having a depth greater than the thickness of the V-belt and said pulley section having a cam face opposite the belt engaging face thereof; an abutment plate fixed on said shaft presenting a cam face opposed to the cam face of the floating pulley section, the cam faces of the pulley section and abutment converging radially outward; a plurality of radially movable wedge-shaped segments about the shaft providing cam faces converging radially outwardly and adapted in radially expanded position to engage the respective cam faces of the floating pulley section and abutment in simultaneous wedging engagement therewith to maintain said belt engaging faces of the pulley sections in driving contact with the V-belt; said segments having a radially inward collapsed position, in which position, with one cam face of the segments in engagement with said abutment cam face, a clearance is provided to allow the floating pulley section to take a position simultaneously free of the belt and segments, and in which position of the segments the floating pulley section is axially unrestrained for movement along the shaft between contact position with the segments and contact position with the belt; and means positively rotating with the shaft providing a driving engagement with said segments transversely of the shaft to rotate the segments while the segments are in collapsed position.

2. A device of the class described comprising: a shaft; a first pulley section rotatable with the shaft providing a conical belt-enagaging face; a floating pulley section mounted on the shaft to rotate therewith and providing a complementary conical belt-engaging face forming a V-groove with the first pulley section adapted to receive a V-belt, said V-groove having a depth greater than the thickness of the V-belt and said pulley section having a cam face opposite the belt engaging face thereof; an abutment plate fixed on said shaft presenting a cam face opposed to the cam face of the floating pulley section; a plurality of radially movable wedge-shaped segments about the shaft providing cam faces converging radially outwardly and adapted in radially expanded position to engage the respective cam faces of the floating pulley section and abutment in simultaneous wedging engagement therewith to maintain said belt engaging faces of the pulley sections in driving contact with the V-belt; means biasing said segments radially inward to collapsed position; a clearance being provided when said segments are in radially inward collapsed position with one cam face of the segments in engagement with said abutment cam face to allow the floating pulley section to take a position simultaneously free of the belt and segments, and in which position of the segments the floating pulley section is axially unrestrained for movement along the shaft between contact position with the segments and contact position with the belt; said segments having an internal concave surface adapted to engage a surface positively rotatable with the shaft to form a driving engagement between said segments and latter surface to rotate the segments while the segments are in collapsed position.

3. A device as specified in claim 2 wherein said surface rotatable with the shaft comprises a sleeve extending from the floating pulley.

4. A device as specified in claim 2 wherein said biasing means comprises a helical spring in the form of a torroid circumscribing said segments.

5. A device as specified in claim 4 wherein said abutment plate and floating pulley section provide a flange circumscribing and enclosing the wedge segments and spring.

MARION H. DAVIS.

REFERENCES CITED

The following references are of record in the file of this patent:

UNITED STATES PATENTS

| Number | Name | Date |
|---|---|---|
| 2,104,074 | Erbach | Jan. 4, 1938 |
| 2,108,356 | Twomley | Feb. 15, 1938 |
| 2,139,048 | Twomley | Dec. 6, 1938 |
| 2,144,443 | Thomas | Jan. 17, 1939 |
| 2,151,987 | Perrine | Mar. 28, 1939 |
| 2,180,217 | Thomas | Nov. 14, 1939 |
| 2,253,634 | Mack | Aug. 26, 1941 |
| 2,283,267 | Kohl | May 19, 1942 |
| 2,496,061 | Miner | Jan. 31, 1950 |
| 2,496,201 | Dodge | Jan. 31, 1950 |
| 2,521,884 | Thostenson | Sept. 12, 1950 |